US007668865B2

(12) United States Patent
McDonald

(10) Patent No.: US 7,668,865 B2
(45) Date of Patent: Feb. 23, 2010

(54) DOCUMENT ANALYSIS SYSTEM AND METHOD

(76) Inventor: Nathan Joel McDonald, PO. Box 1447, Maroubra, NSW, 2035 (AU)

( * ) Notice: Subject to any disclaimer, the term of this patent is extended or adjusted under 35 U.S.C. 154(b) by 223 days.

(21) Appl. No.: 10/486,522

(22) PCT Filed: Aug. 14, 2002

(86) PCT No.: PCT/AU02/01106

§ 371 (c)(1), (2), (4) Date: Feb. 7, 2004

(87) PCT Pub. No.: WO03/017130

PCT Pub. Date: Feb. 27, 2003

(65) Prior Publication Data

US 2005/0065975 A1    Mar. 24, 2005

(30) Foreign Application Priority Data

Aug. 14, 2001    (AU) .................................... PR 7017

(51) Int. Cl.
*G06F 17/00*    (2006.01)
(52) U.S. Cl. .................... 707/104.1; 715/229; 715/203; 715/236
(58) Field of Classification Search ...................... 707/6; 715/517
See application file for complete search history.

(56) References Cited

U.S. PATENT DOCUMENTS 5,247,437 A * 9/1993 Vale et al. ....................... 707/1
5,774,888 A * 6/1998 Light ............................... 707/1
5,812,995 A * 9/1998 Sasaki et al. .................... 707/1
6,233,592 B1    5/2001 Schnelle et al.
6,263,336 B1 * 7/2001 Tanaka ............................ 707/6

FOREIGN PATENT DOCUMENTS

EP    1107169 A1    6/2001
WO    01/40966 A1    6/2001

OTHER PUBLICATIONS

Giovanni Semeraro, Stefano Ferilli, Nicola Fanizzi & Floriana Esposito; "Document classification and interpretation through the inference of logic-based models"; Lecture Notes in Computer Science, vol. 2163, Sep. 4, 2001, pp. 59-70, XP002521698, Berlin/Heidelberg, Germany.
Wahl, F.M. et al; "Block segmentation and text extraction in mixed text/image documents"; Computer Graphics and Image Processing, Academic Press, New York, US, vol. 20, 1982, pp. 375-390, XP001189623.

* cited by examiner

*Primary Examiner*—Sathyanarayan Pannala
(74) *Attorney, Agent, or Firm*—Gardner Patent Services

(57) ABSTRACT

Documents having a structured nature such as contracts, legislation, etc. can be formatted to emphasize their logical structure. In a document formatting method, a set of document element classes each representing a logical operator may be defined. Each document element class may have a set of document section formatting rules and a defined set of document elements such as text strings that provide an expression of the logical operator of the class. Document elements within a document may be identified and used to classify a document section containing the document elements into one or more of the document element classes. The formatting rules of the classified class may then be used to re-format the particular document section so that a reformatted version of the document section accords with the formatting rules for document sections of that class.

19 Claims, 24 Drawing Sheets

| | "Multiple" requirements | |
|---|---|---|
| 126 | Compliance Rules | Each of the unique requirements must be satisfied for compliance |
| | Example requirement | A and B |
| 124 | Color coding | Green |
| 122 | Summary word | and |
| 121 | Document elements | • &<br>• along with<br>• also<br>• and<br>• as well as<br>• covering all things<br>• furthermore<br>• in addition to<br>• includes<br>• including<br>• moreover<br>• plus<br>• together with<br>• with |
| 123 | Mark up symbols | Semi-circle<br><br>a and b<br><br>a and b<br><br>a and b<br><br>A and B |
| 125 | Document mapping layouts | and<br>┌──┴──┐<br>a     b |

Figure 12

| | "Choice of" requirements |
|---|---|
| Compliance Rules | The choice must be satisfied for compliance |
| Example requirement | A or B |
| Color coding | Red |
| Summary word | or |
| Document elements | • alternative<br>• any two of the following<br>• choice between<br>• either<br>• one of the following<br>• or<br>• or else<br>• one or more of the following<br>• otherwise<br>• two or more of the following |
| Mark up symbols | Circle<br><br>a or b<br><br>a ( or ) b<br><br>a ● b<br><br>a or b ○<br><br>a or b (large circle) |
| Document mapping layouts | (or) → a, b |

| | Conditional requirements | |
|---|---|---|
| | "Trailing Conditional" | "Leading Conditional" |
| Compliance Rules | Assess whether Condition B is met. If Condition B is met, then Consequence A must be met. | Assess whether Condition A is met. If Condition A is met, then Consequence B must be met. |
| Example requirement | A if B | If A then B |
| Color coding | Blue | |
| Summary word | if | if then |
| Document elements | <ul><li>after</li><li>as soon as</li><li>before</li><li>but</li><li>for</li><li>granting that</li><li>if</li><li>in the case of</li><li>in the event of</li><li>on</li></ul> | <ul><li>on condition that</li><li>once</li><li>provided</li><li>proviso</li><li>subject to</li><li>unless</li><li>upon</li><li>when</li><li>where required by</li><li>without</li></ul> |
| Dividers | | Consequence<ul><li>then</li><li>, (comma)</li></ul> ⎯ 129 |
| Mark up symbols | Diamond<br><br>a if b<br><br>a ⟨if⟩ b<br><br>a if b ⟨⟩<br><br>a ⟨if⟩ b | Diamond and Oval<br><br>if b then a<br><br>⟨if⟩ b, (then) a<br><br>⟨⟩ if b, then a ◯<br><br>⟨if⟩ b, (then) a ⎯ 323 |
| Document mapping layouts | a<br>│<br>⟨if⟩<br>│<br>b | ⟨if⟩<br>│<br>a<br>│<br>(then)<br>│<br>b |

Figure 14

| Exception requirements |||
|---|---|---|
| | "Trailing Exception" | "Leading Exception" |
| Compliance Rules | Requirement must be complied with except when certain requirements are complied with ||
| Example requirement | A except for B | Except for B, A |
| Color coding | Orange ||
| Summary word | except | except |
| Document elements | <ul><li>apart</li><li>aside from</li><li>bar</li><li>barring</li><li>besides</li><li>but, but not</li><li>despite</li><li>expect for</li><li>excepting</li><li>exclude</li></ul> | <ul><li>excluding</li><li>exclusive of</li><li>exempt</li><li>from</li><li>not including</li><li>omitting</li><li>other than</li><li>unless</li><li>with the exception of</li></ul> |
| Dividers | | Usual requirement<ul><li>, (comma)</li></ul>    129 |
| Mark up symbols | Hexagon<br><br>a except for b<br>a ⬡except⬡ for b<br>a except for b ⬡⬡<br>a ⬢except⬢ for b | Hexagon and Oval<br><br>except for b, a<br>⬡except⬡ for b ( ) a<br>⬡⬡ except for b, a ( ) |
| Document mapping layouts | a<br>│<br>⬡except⬡<br>│<br>b | ⬡except⬡<br>│<br>a<br>│<br>( , )<br>│<br>b |

Figure 15

| Preferential requirements | | |
|---|---|---|
| | "Comparative preferential" | "Progressional preferential" |
| Compliance Rules | A check is made as to which requirement is preferred and then that requirement is to be complied with | A check is to be made as to which requirement is preferred first and that requirement is to be complied with before successive preferences |
| Example requirement | Prefer the faster of A and B | Prefer A to B |
| Color coding | Pink | |
| Summary word | prefer | prefer, to |
| Document elements | <ul><li>desire</li><li>descending, ascending</li><li>fancy</li><li>first, second, third, etc</li><li>greater, shorter, longer etc</li><li>greatest, shortest, longest, etc</li><li>last</li><li>middle, median, average</li></ul> | <ul><li>prefer</li><li>preference</li><li>preferential</li><li>priority</li><li>rather</li><li>runner up</li><li>the most, least</li><li>wish</li></ul> |
| Dividers | | <ul><li>than</li><li>to</li></ul> 129 |
| Mark up symbols | Triangle<br><br>prefer the faster of a and b<br><br>prefer the faster of a and b<br><br>prefer the faster of a and b<br><br>prefer the faster of a and b | Triangle and Oval<br><br>prefer a to b<br><br>prefer a (to) b<br><br>prefer a to b ( ) |
| Document mapping layouts | prefer the faster of<br>a   b | prefer<br>a<br>to<br>b |

Figure 16

| Mandatory and Optional Requirements | | |
|---|---|---|
| | "Mandatory" | "Optional" |
| Compliance Rules | Compliance with the is <u>mandatory</u> | Compliance with the requirement is <u>optional</u> |
| Example requirement | party <u>shall</u> A and B | party <u>may</u> A and B |
| Color coding | Black | |
| Summary word | shall | should |
| Document elements | <ul><li><u>as required by</u></li><li><u>comply with</u></li><li><u>has had</u></li><li><u>have to</u></li><li><u>in accordance with</u></li><li><u>is</u></li><li><u>must</u></li><li><u>normative</u></li><li><u>shall, shall not</u></li><li><u>will, will not</u></li><li><u>may not</u></li></ul> | <ul><li><u>can</u></li><li><u>could</u></li><li><u>informative</u></li><li><u>may</u></li><li><u>might</u></li><li><u>ought to</u></li><li><u>perhaps</u></li><li><u>should</u></li><li><u>suitable form of</u></li></ul> |
| Mark up symbols | Solid underline<br><br>party <u>shall</u> a and b | Broken underline<br><br>party <u>may</u> a and b |
| Document mapping layouts | 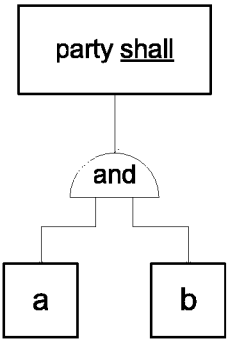 | 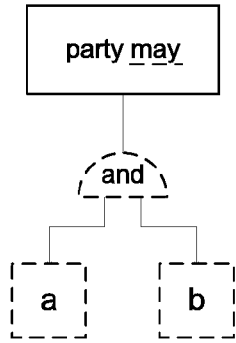 |

Figure 17

| | Sequential requirements | |
|---|---|---|
| Compliance Rules | Each of the unique requirements must be satisfied for compliance | |
| Example requirement | A then B | |
| Color coding | Grey | |
| Summary word | then | |
| Document elements | <ul><li>chain</li><li>cycle</li><li>first, firstly</li><li>in the following order</li><li>progression</li><li>run</li><li>second, secondly</li><li>sequence</li><li>series</li><li>string</li><li>succession</li><li>train</li></ul> | |
| Dividers | Successive requirements<br>• then<br>• , (comma) | 129 |
| Mark up symbols | Oval<br><br>party shall a, then b<br><br>party shall a, (then) b<br><br>party shall a, then b ◯ | |
| Document mapping layouts | 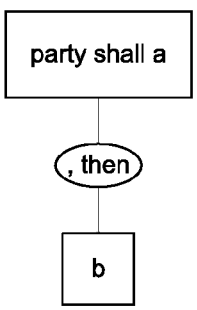 | |

Figure 18

A, and B or C

A and B, or C

Structure of requirements

| | | |
|---|---|---|
| Multiple requirements | Each of the unique requirements must be satisfied for compliance. ~211 | a and b  212 |
| Choice of requirements | The choice must be satisfied for compliance. ~213 | a or b  214 |
| Requirements with Leading conditions | A check is to be made as to whether the condition is complied with, and whether the consequence needs to be complied with. If the consequence is to be complied with, then it must be. ~215 | if b, then a  216 |
| Requirements with Trailing conditions | | a if b |
| Requirements with leading exceptions | A requirement must be complied with, except when certain requirements are complied with. | Except for b, a |
| Requirements with trailing exceptions | | a except for b |
| Comparative preferences | A check is to be made as to which requirement is preferred, and then that requirement is to be complied with. | prefer the faster of a and b |
| Progressional preferences | A check is to be made as to which requirement is preferred first, and then that requirement is to be complied with before successive preferences. | prefer a to b |

Intensity of requirements

| | | |
|---|---|---|
| Mandatory requirements | Compliance with the requirement is mandatory. | shall a |
| Optional requirements | Compliance with the requirement is optional. | should a |

4.2 METHOD OF QUALIFICATION OF WELDING PROCEDURE

A welding procedure shall be qualified by one of the following methods:

a) A prequalified procedure in accordance with Clause 4.3.

b) Production of documentary evidence of relevant prior experience by the fabricator.

c) Production of a suitable length of test piece of the same joint type, material type, material thickness and edge preparation as the requirement upon which the procedures are to be applied and testing it in accordance with Clause 4.6 where the type of joint allows such testing. The test piece may be made as a production test piece.

d) Preparation of a special test piece, such as shown in Figure 4.6.3, which simulates as closely as practicable the weld penetration, material type and direction of rolling, material thickness, edge preparation, welding conditions including welder access and conditions of restraint to be used in production, and testing it in accordance with Clause 4.6.

e) Destructive testing of a prototype joint, structure or component.

4.3 PREQUALIFIED WELDING PROCEDURES

Welding procedures shall be deemed to be prequalified where— a) the joint preparations are prequalified in accordance with Clause 4.4 b) the consumables are prequalified in accordance with Clause 4.5;

c) the workmanship and welding techniques, including the preheat and interrun temperature requirements comply with this Standard; and d) where required by Clause 4.6.2, //documentary evidence is available of a satisfactory macro test in accordance with Clause 4.6.5.

Figure 21

Multiple requirements embedded within the condition of a leading conditional requirement
81 If [b and c], then a.
      82
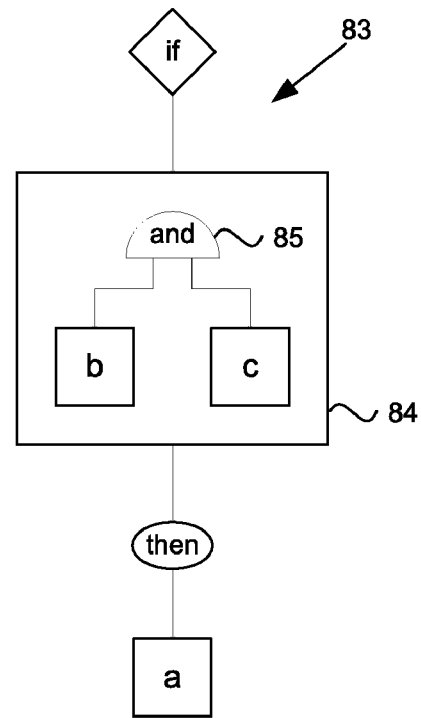
Multiple requirements embedded within the primary preference of a progressional preference requirement.
86 Prefer [a and b], to c.
      87
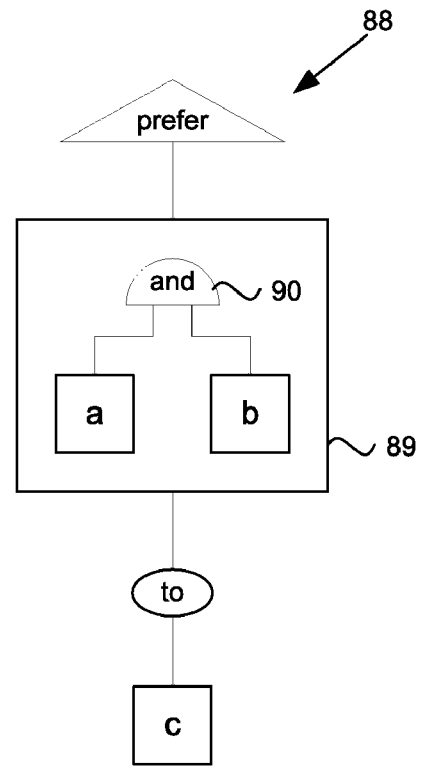
Figure 24

DOCUMENT ANALYSIS SYSTEM AND METHOD

FIELD OF THE INVENTION

This invention relates to a system for analyzing, processing and navigating through documents, and in particular documents of a structured nature for example legal and semi-legal documents such as contracts, warranties, policies, legislation etc.

BACKGROUND OF THE INVENTION

The nature of language means that many different words and phrases can be used to describe a particular situation. As such, there is generally no consistent drafting style between two different draftspeople and thus it is difficult to produce a consistent and universal set of document interpretation rules. In addition, many structured or formatted documents contain lengthy and complex clauses that make navigating through the document difficult. It is an object of the invention to provide a system and method for analyzing and interpreting documents. It is a further object of the invention to provide a system for constructing structured documents.

SUMMARY OF THE INVENTION

In one aspect, there is provided a method of formatting a document, such as an electronic version of a structured document having one or more clauses or other structured sections. The method may be based on a defined set of document element classes. Each document element class may have a set of document section formatting rules and a defined set of document elements. Document elements within a document may be identified and used to classify a document section containing the document elements into one or more of the document element classes. The formatting rules of the classified class may then be used to re-format the particular document section so that a re-formatted version of the document section accords with the formatting rules for document sections of that class.

The document element classes may each be representative of an individual logical operator and the document elements within a particular document element class may be different text strings used to express that particular logical operator. In various embodiments, re-formatting of the document section may include highlighting the document elements within the document section substituting non-preferred text or structure for preferred text or structure and/or formatting the document section into a document map.

The document sections may be clauses of a document and the formatting rules may determine how the clause is to be formatted.

In one aspect, there is provided a system for formatting a document. The system includes a database that stores document element classes with each document element class having a set of document elements and a set of document section formatting rules. A processor of a computer system that is operatively associated with the database can cause a display to display an electronic document. The processor may also cause an interface to be presented on the display. The interface allows a document element to be identified within the electronic document and for a document section of the electronic document to be associated with the identified document element. Using the document section formatting rules, a document section that contains a document element belonging to a particular class can be re-formatted to accord with the formatting rules of that class. The resulting re-formatted document can be displayed on the display.

BRIEF DESCRIPTION OF THE DRAWINGS

The invention will now be described, by way of non-limiting example only, with reference to preferred embodiments and to the accompanying drawings in which:

FIG. 12 shows example characteristics of a Multiple Requirements element class;

FIG. 13 shows example characteristics of a Choice Of Requirements element class;

FIG. 14 shows example characteristics of a Conditional Requirements element class;

FIG. 15 shows example characteristics of an Exception Requirements element class;

FIG. 16 shows example characteristics of a Preferential Requirements element class;

FIG. 17 shows example characteristics of a Mandatory Requirements element class and an Optional Requirements element class;

FIG. 18 shows example characteristics of a Sequential Requirements element class;

FIG. 20 shows validation tables for the element classes;

FIG. 21 shows a sample contract document;

FIG. 24 shows examples of mapping of embedded requirements.

DETAILED DESCRIPTION OF THE EMBODIMENTS

Many structured or formatted documents contain lengthy and complex clauses that make navigating through the document difficult. The system of the present invention recognizes that while such documents are unique and contain sections drafted for the express purpose of the particular document, these sections are typically linked using specific and generic grammatical constructs that are common to many documents.

Figure 1:
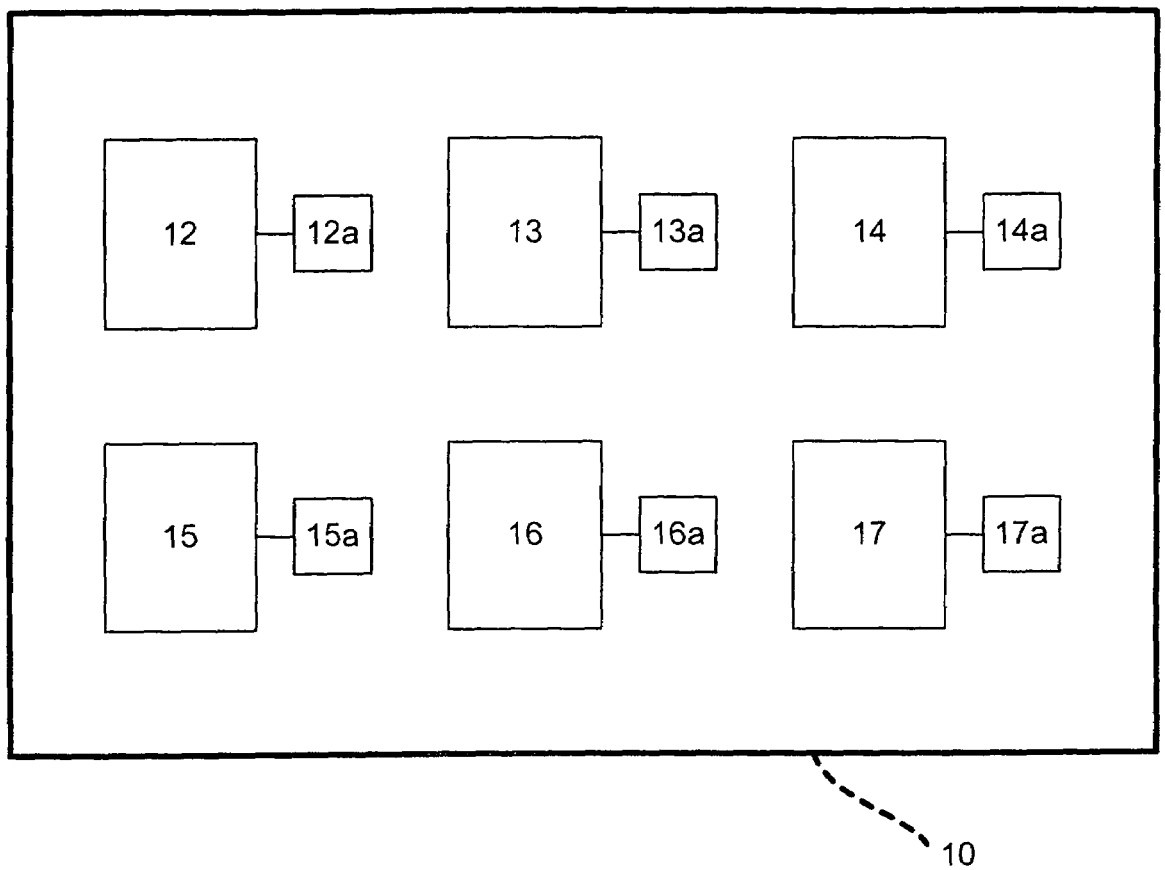
FIG. 1 is a schematic of a database used in the present invention.

The system of the present invention as depicted in FIG. 1 includes a database 10 containing a set of element classes 12, 13, 14, 15, 16, 17. Each element class has a class heading and a plurality of document elements. Each element class also has a linked set of document formatting and mapping rules 12a, 13a, 14a, 15a, 16a, 17a described in greater detail below with reference to FIGS. 12 to 18.

The element class heading represents a grammatical function type found in a document. The document elements for an element class include the standard ways in which that function type may be grammatically expressed within a document. That is, the class represents a logical operator and the document elements are the text strings used to express the logical operator. Typically the document elements are grammatical construct elements used to link "requirements" e.g. of a clause in a contract. For example a clause may specify:

"Statement A AND Statement B", where "Statement A" represents a first requirement, "Statement B" represents a second requirement. The "AND" element is the grammatical construct element used to construct the link between the first and second requirements. The "AND" element also identifies the rule for satisfying the entire clause, i.e. to satisfy an "AND" clause, all requirements (Statement A, Statement B in the present example) must be satisfied, i.e. must be TRUE, in order for the clause to be deemed complied with.

In FIGS. 12 to 18, element classes or operator classes are shown for the following classes: multiple requirements (FIG. 12); choice of requirements; (FIG. 13), conditional requirements (FIG. 14) including leading conditional requirements and trailing conditional requirements; exception requirements (FIG. 15) including leading exceptions and trailing exceptions; preferential requirements (FIG. 16) including comparative preferential requirements and progressional preferential requirements; mandatory requirements (FIG. 17); optional requirements (FIG. 17) and sequential requirements (FIG. 18).

With specific reference to FIG. 12, it is shown that each element class has characteristics specific to the class. One characteristic is the document elements 121 for the class. The document elements are the typical words, phrases, text strings etc that can be used to express the document element. By way of example, the "Multiple Requirements" class includes as document elements 121 within the class, the words and phrases or text strings "&"; "along with"; "also"; "and"; "as well as"; "covering all things"; "furthermore"; "in addition to"; "includes"; "including"; "moreover"; "plus"; "together with"; "with". The term "AND" is the lead document element and is provided as a summary word 122.

Additional characteristics of the document class include document section formatting rules such as mark-up symbols 123 and color coding 124 that may be used as highlighting in a text document, document mapping layouts 125 that may be used for creating document maps, and compliance rules 126 that can be used for compliance mapping of a document as will be described in greater detail below. While specific reference is made to the "Multiple Requirements" class shown in FIG. 12, a person skilled in the art will readily recognize components of the other classes shown in FIGS. 13 to 18 that correspond to the components of the Multiple Requirements discussed above, including document elements, summary words, mark up symbols, color coding, document mapping layouts and compliance rules. Thus, in the interests of clarity and conciseness, no further elucidation of the other classes is considered necessary here.

The embedded requirements are typically inserted into the requirement box when there is a following requirement. For example, FIG. 24 shows an example with an embedded requirement [b and c] 82 within the leading conditional statement "If [b and c], then a" 81. In the document map corresponding to the statement 81, the document mapping symbol 83 for the leading conditional class (FIG. 14) is used. The document mapping symbol 83 includes a box 84 that represents the leading conditional requirement, which, in the present example is the statement [b and c] 81. Since the leading conditional requirement contains an embedded "AND" clause, the document mapping symbol for the AND clause (see FIG. 12) is embedded 85 within the leading conditional requirement box 84. Also shown in FIG. 24 is an example of a progressional preference statement "Prefer [a and b] to c" 86 which contains the embedded statement [a and b] 87. The document map for the statement 86 uses the document mapping symbol 88 for the progressional preference class shown in FIG. 16 with the symbol 90 for the embedded AND statement 87 and the associated requirements (a, b) being displayed within the primary preference box 89.

An example of analyzing a document in accordance with a preferred aspect of the invention will now be described. As a first step, an original document is reviewed to identify any words and/or phrases (and associated punctuation) that match members of the element classes. The document elements identified form dividers between text blocks, typically containing the requirements for those document elements, that allow the document to be divided into sections. In terms of producing a document map for showing the logical structure of a document, the actual text or expression of a requirement is unimportant.

Figure 2:
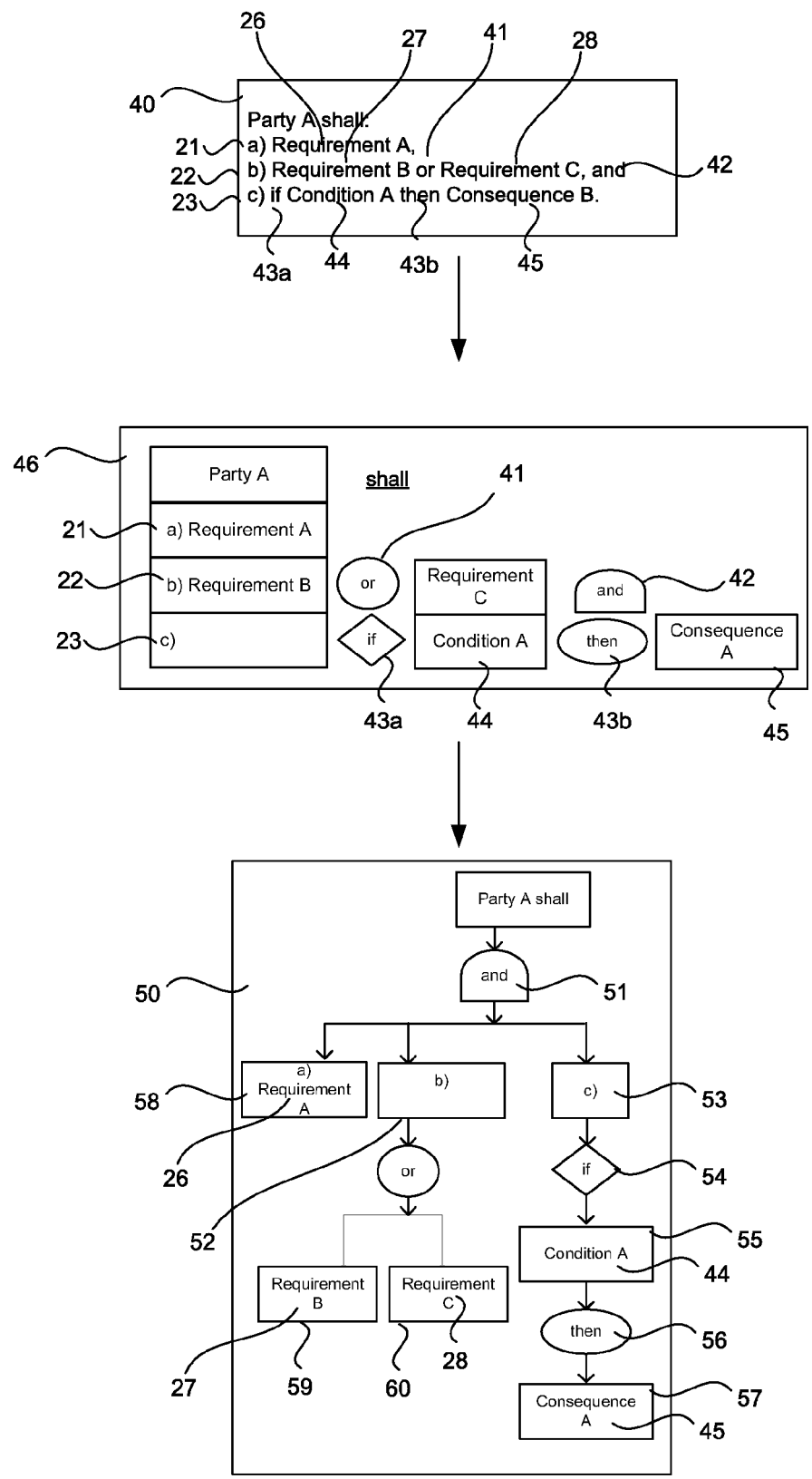
FIG. 2 shows a schematic sample of a document being converted to a document map.

A map of the document can then be constructed using the mapping rules for the element classes to which the identified document elements belong. A simplified example of the process is illustrated in FIG. 2 in which a contract 40 is processed to produce a marked-up document 46. In producing the marked-up document 46, the system has identified the document elements "or" 41, "and" 42 and "if"/"then" 43 and produced the marked-up document 46 in accordance with the mark-up symbols listed for the "Choice Requirements" 223 (FIG. 13), "Multiple Requirements" 123 (FIG. 12) and "Leading Conditional Requirements" 323 (FIG. 14) classes.

The marked-up document 46 is then converted to a document map 50. In constructing the map 50 the "and" element 42 is identified, as are the three requirements headed "a)" 21, "b)" 22 and "c)" 23. An "AND" node 51 is created on the map, being the symbol 123 (FIG. 12) for elements in the "Multiple" class. Three branches extend from beneath the AND node 51 to receive the respective requirements "a)" 21, "b)" 22 and "c)" 23. The text of "Requirement A" 26 is placed into the first branch text box 58. Within sub-clause "b)", the element "or" 41 is identified between two requirements, "Requirement B" and "Requirement C". The "or" element is classified in the "Choice of" class and is depicted on the map as an "OR" node 52, being the map symbol 223 used for "Choice of" elements (see FIG. 13). The "OR" node 52 is displayed on the second branch from the "AND" node 51 with the text of "Requirement B" 27 and "Requirement C" 28 being displayed in respective boxes 59, 60 branching from the "OR" node 52.

Within sub-clause "c)" 23 the "if" and "then" elements 43a, 43b are identified. An IF/THEN statement has the general form "If condition then consequence". In the present example, the leading conditional requirement "Condition A" 44 is identified between the "if" 43a and "then" 43b elements and the consequential requirement "Consequence A" 45 follows the "then" element 43b. The map 50 depicts the requirement of sub-clause "c)" using text box 53 on the third branch extending from the "AND" node 51. Text box 53 is connected to the "IF" symbol as prescribed by the leading conditional class symbol 323 depicted in FIG. 14. The text of the conditional requirement "Condition A" 44 is provided in the text box 55. A "THEN" symbol 56 is connected to the "Leading Condition" text box 55. The "THEN" symbol 56 is then connected to the Consequential condition text box 57 which receives the text of the consequential requirement "Consequence A" 45.

The output of the document analysis system is thus a formatted document that allows the document to be more clearly navigated. In one embodiment, the formatted document is a map 50 of the type illustrated in FIG. 2. In an alternative embodiment, the formatted document may be the document 46 in substantially the same form as the original document but with the document elements highlighted with the appropriate colors, fonts, etc in accordance with the format rules such as the mark-up symbols 123 and color codes 124 described above with reference to FIGS. 12 to 18.

Whether or not a word within a document is identified as a document element can depend upon its context, that is, on any surrounding words, phrases or punctuation. For example, not every occurrence of the word "AND" within a document will necessitate a node to be created for it. It may only be required in cases of the following form:

Condition Statement
a) First requirement
b) Second requirement; and
c) Third requirement.

Thus the identification of an occurrence of the word "AND" as a document element may be conditional on it being immediately proceeded by a semicolon ";" or like divider. Example dividers 129 are shown in FIGS. 14, 15, 16, and 18.

A further and more complex example of a conditional classification of an identified element into an element class occurs with the terms "two or more", "three or more" and the like. Such terms will form a subset of the "Choice of" class (FIG. 13) as more than one but not all of the requirements pertaining to the element will need to be met for the entire requirement to be complied with. Thus, after identifying the presence of an "or" within a document, it is necessary to analyze the surrounding words and/or punctuation to determine the context of the element to ascertain whether the element falls within a subset of the broader element class.

Figure 19A:
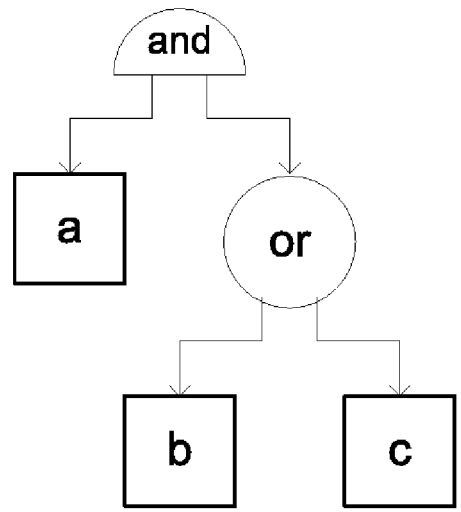
FIG. 19 illustrates alternative methods for displaying a statement dependent on punctuation.
Figure 19B:
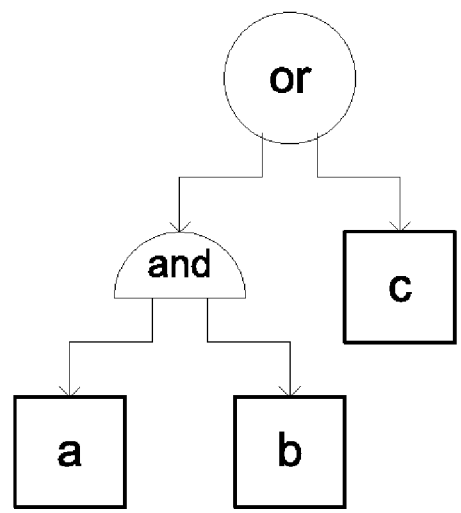

Punctuation in the original document will play an important role in determining the relationship between text sections and the document elements. An example is the contract condition "(a) and (b) or (c)" which, as shown in FIGS. 19a and 19b, can be represented in two different ways depending on how the statement is punctuated. FIG. 19a maps the statement "A, and B or C" whereas FIG. 19b maps the statement "A and B, or C". Punctuation, headings and numbered sections e.g. a, b, c . . . ; i, ii, iii . . . ; can be used to correctly divide the document into text sections.

In a preferred embodiment of the invention, the system is a software application executed on a computer processor that accesses an electronic database storing the element class information. The system includes application programs and an electronic database and/or electronic libraries storing the element classes and rules, as shown and described with respect to FIG. 1 and FIGS. 12 to 18. The software application is adapted to run on a computer terminal such as a personal computer or work station.

Initially, an original document to be analyzed and mapped is obtained in an electronic format such as in Microsoft Word™ format. A highlighted version can be obtained by identifying within the original document the document elements as they appear in the document and converting those elements according to the highlighting, i.e. formatting rules for the element class. Document elements within the document are identified using any suitable known search algorithm, of which many are known to the skilled addressee. Similarly, many algorithms for highlighting the identified document elements in accordance with the appropriate formatting rules would be known to the skilled addressee. The following is a simple search and formatting algorithm for locating the document element "and" and displaying the element in green, as specified by the rule for "Multiple Requirements" class:

```
Sub CTB_Contract_HIGHLIGHTS( )
'
' CTB_Contract HIGHLIGHTS Macro
' Macro recorded 06/11/00 by Nathan McDonald
'MULITPLE REQUIREMENTS (GREEN)
    Selection.Find.ClearFormatting
    Selection.Find.Replacement.ClearFormatting
    Selection.Find.Replacement.Font.ColorIndex = wdGreen
    With Selection.Find
        .Text = "and"
        .Replacement.Text = "and"
        .Forward = True
        .Wrap = wdFindContinue
        .Format = True
        .MatchCase = False
        .MatchWholeWord = True
        .MatchWildcards = False
        .MatchSoundsLike = False
        .MatchAllWordForms = False
    End With
    Selection.Find.Execute Replace:=wdReplaceAll
```

Similar algorithms can be used to identify and highlight the other document elements show in FIGS. 12 to 18 using their respective color coding. The process is repeated for each document element stored in the database. The output of the search and format procedure is a formatted version of the original document containing the appropriate highlights. The formatted document is displayed on the graphic user interface (GUI) of the computer terminal.

The display of the formatted document includes a user selectable macro tool that allows the user to override the automatic formatting where a document element has been inappropriately identified.

A further macro allows a user to manually highlight document elements and the associated requirements that use a language outside of the stored document elements. The user selects the text in the document and then selects the macro tool for a document element class. The macro tool then applies the highlighting rules for that class to the selected text.

Figure 3:
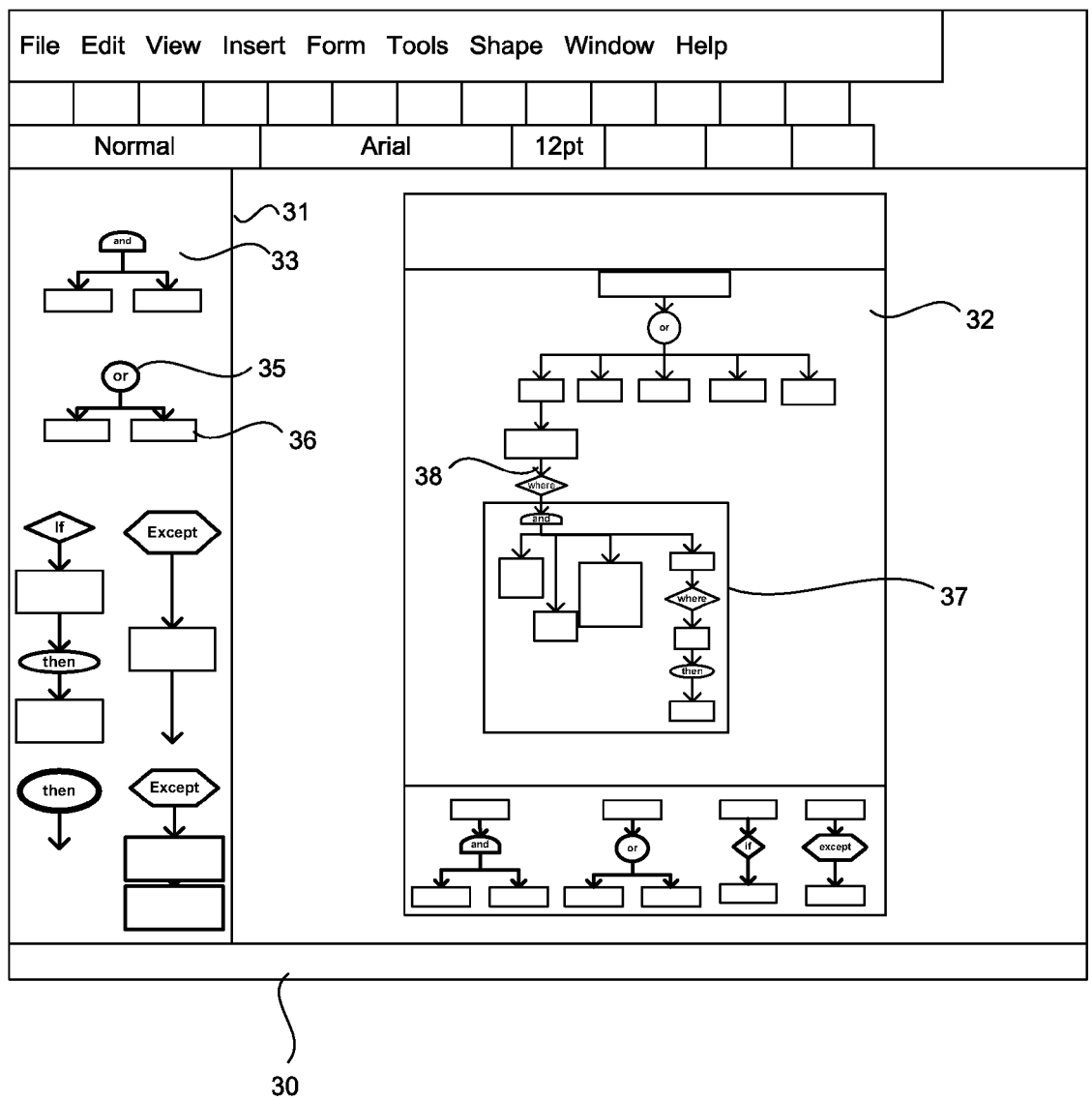
FIG. 3 is a sample screen shot of a mapping software application interface.

The formatted document is then used as the basis for creating a document map through a mapping interface. A sample interface of a mapping application is shown in FIG. 3. One preferred mapping application is based on the Microsoft Visio™ program. The mapping application interface 30 includes a menu 31 and a mapping area 32. The menu displays graphical symbols 33 for each of the element classes. Each symbol represents an element class and includes a class header 35 and linked requirement boxes 36.

The interface of the computer terminal on which the application runs can be manipulated to display the formatted document and mapping applications simultaneously on the GUI.

The user creates the document map 37 clause by clause according to the formatted document. To commence, a user identifies a clause in the formatted document that is to be mapped. The clause will contain a document element and one or more requirements. In the mapping application 30, the user selects from the menu 31 an appropriate element class symbol matching the document element of the clause and drags and drops the symbol into the mapping area 32. The user then highlights and selects a clause requirement from the formatted document and places the text of the requirement in a text box 36 of the symbol in the mapping area. As stated previously, in terms of producing a document map, the actual text or expression of a requirement is unimportant and thus the requirement can be manipulated as a single text block.

Further requirements are placed in additional text blocks of the symbol.

The text of a symbol may be displayed within the symbol in its entirety or alternatively, a summary label may be produced and displayed as a hyperlink with the full text of the requirement being displayed when the text box is selected by the user.

A class symbol will have a default number of requirements. For example, "and" and "or" clauses will each have a minimum of two requirements and thus the symbol displays a default number of two text boxes. Further requirement boxes can be added as necessary, for example by selecting an option from a drop down menu available for that element class symbol. Alternatively, when the user selects a symbol from the menu, the user may be prompted to supply the number of requirement boxes to be included in the symbol.

To continue building the map, the user selects a further clause of the formatted document which may be an individual clause or an embedded clause, and drags the appropriate symbol into the mapping area. The user creates a graphical link 38 between the first and second clauses by dragging the screen cursor between the two symbols to draw the link. The process of filling the requirement boxes is then repeated accordingly.

Figure 4:
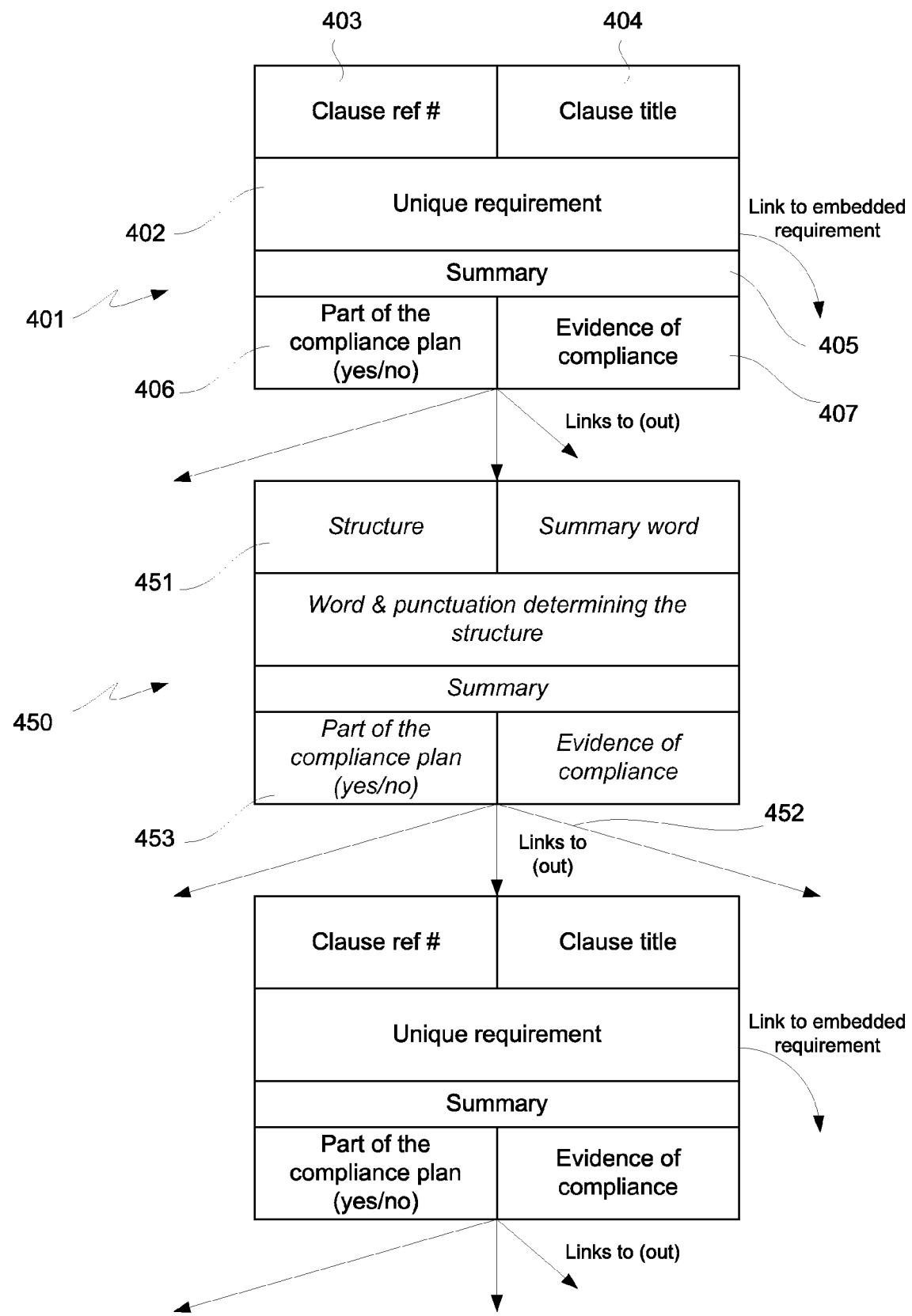
FIG. 4 is a schematic example of a record structure.

When a new symbol is added to the map, an element record is created. Referring to FIG. 4, an element record 450 will have a field for the element class 451 and fields 452 for linking to the requirements related to that element. The element record will further include a validation field 453 for each of the linked requirements and a complete validation field. The complete validation field is governed by a rule for the element class as will be described in greater detail below.

When a requirement is added, a requirement record is created. The element record becomes a parent record to each of the subordinate requirement records. An exemplary requirement record structure is shown in FIG. 4. Each requirement record 401 will have a text field 402 that stores the text of the requirement. Further record fields include a clause identifier 403, clause title 404, summary or label field 405, compliance box 406 and evidence field 407. The record will also contain addressing fields for linking to the parent element record and subsequent element or requirement records, and embedded requirements.

The map is thus stored electronically as a series of linked requirement records and element records.

Figure 10A:
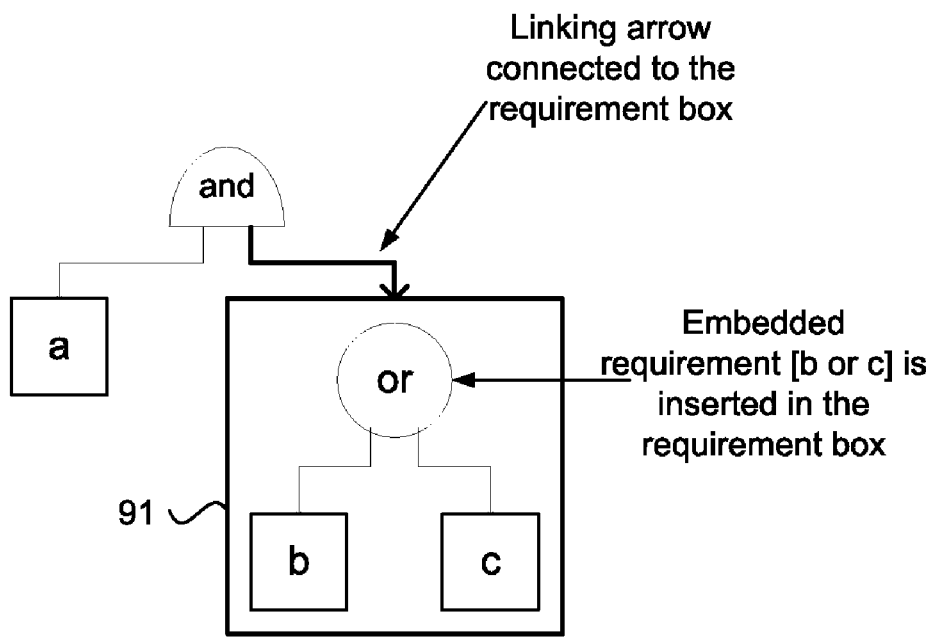
FIG. 10 shows a preferred method for mapping embedded requirements.
Figure 10B:
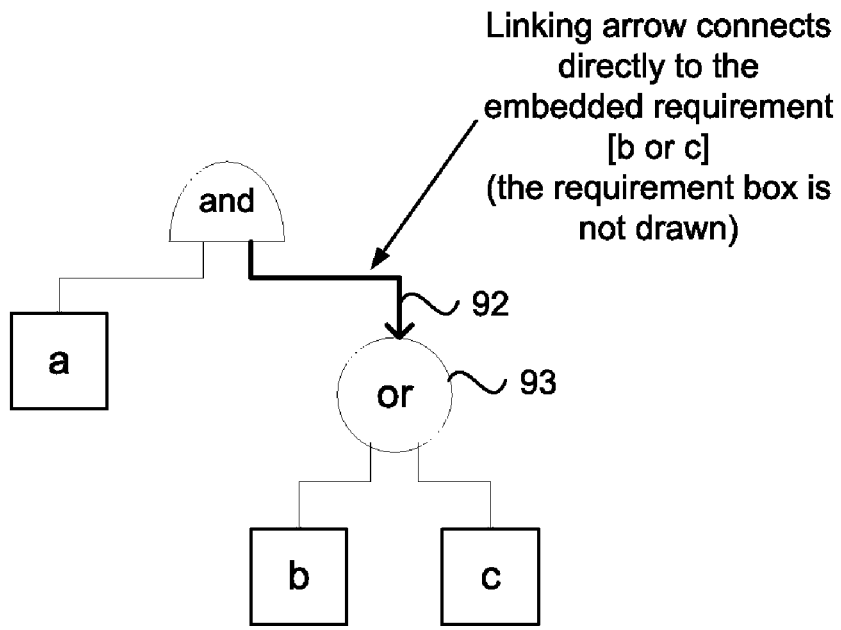

Contracts often have requirements embedded within others. A set of brackets may be used to highlight the embedded requirements in the highlighted document. With reference to FIG. 10 which shows a document map for the phrase "A and, [b or c]", when creating the document map, embedded requirements (i.e. [b or c]) are to be either inserted into the unique requirement box 91 as shown in FIG. 10*a* or connected directly 92 to the embedded structural symbol 93 as shown in FIG. 10*b*.

The software application also supports an automatic navigation or validation process. Whilst the compliance rules would ordinarily be specified and stored with the element class rules (as shown in FIGS. 12 to 18), the compliance rules are detailed in FIG. 20.

Using the validation process, a user can navigate through a document by validating that particular requirements of the document have been met. A user validates a requirement by selecting an appropriate icon on the interface pertaining to that requirement. The software then updates the compliance field 453 of that requirement record 451 (see FIG. 4) with a compliance status, e.g. TRUE, FALSE etc. The compliance field of the parent element record relating to that requirement is also updated. The system further prompts the user to provide compliance evidence, e.g. a receipt number, link to a document or other evidence that the requirement is met. In this way, the user's own record keeping is enhanced. Validation of a requirement can be indicated on the user interface, e.g. by shading the requirement.

In an alternative embodiment, a non-blank compliance evidence field is deemed to indicate that evidence of compliance with the requirement exists and accordingly, a non-blank validation field triggers the updating of the compliance field to a validated status.

Validation of an entire clause can be indicated by shading the entire clause. The element classes may store validation rules that allow the formatting of validated clauses to be performed automatically. For example, as shown in FIG. 20, the validation rules 211 for an "AND" clause 212 will specify that all requirements must be validated, the validation rules 213 for an "OR" clause 213 will specify that any one of the requirements must be validated whilst the validation rules 215 for an "IF/THEN" clause 216 specify that if the leading condition requirement is validated, then the consequence condition must also be validated. To determine whether the entire clause can be validated, the software checks the compliance fields of the element record for a compliance status. If the necessary requirement records have a complied status in the compliance field, the entire clause is validated and the complete compliance field of the element record is updated with a validated status. A validated status in the complete compliance field triggers the display of the entire clause to be highlighted accordingly.

Figure 5:
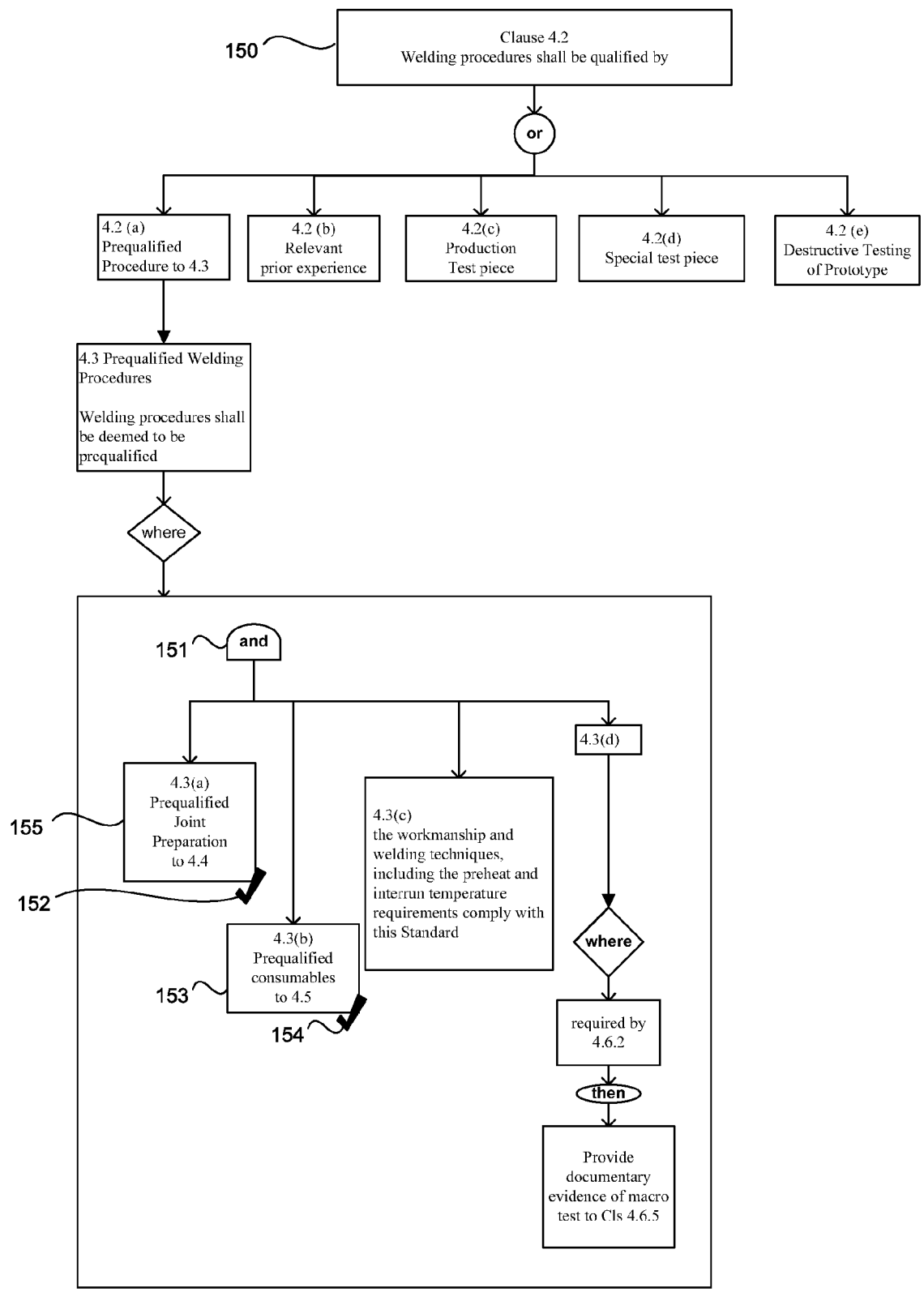
FIG. 5 shows a document map after an initial step in a validation process.
Figure 6:
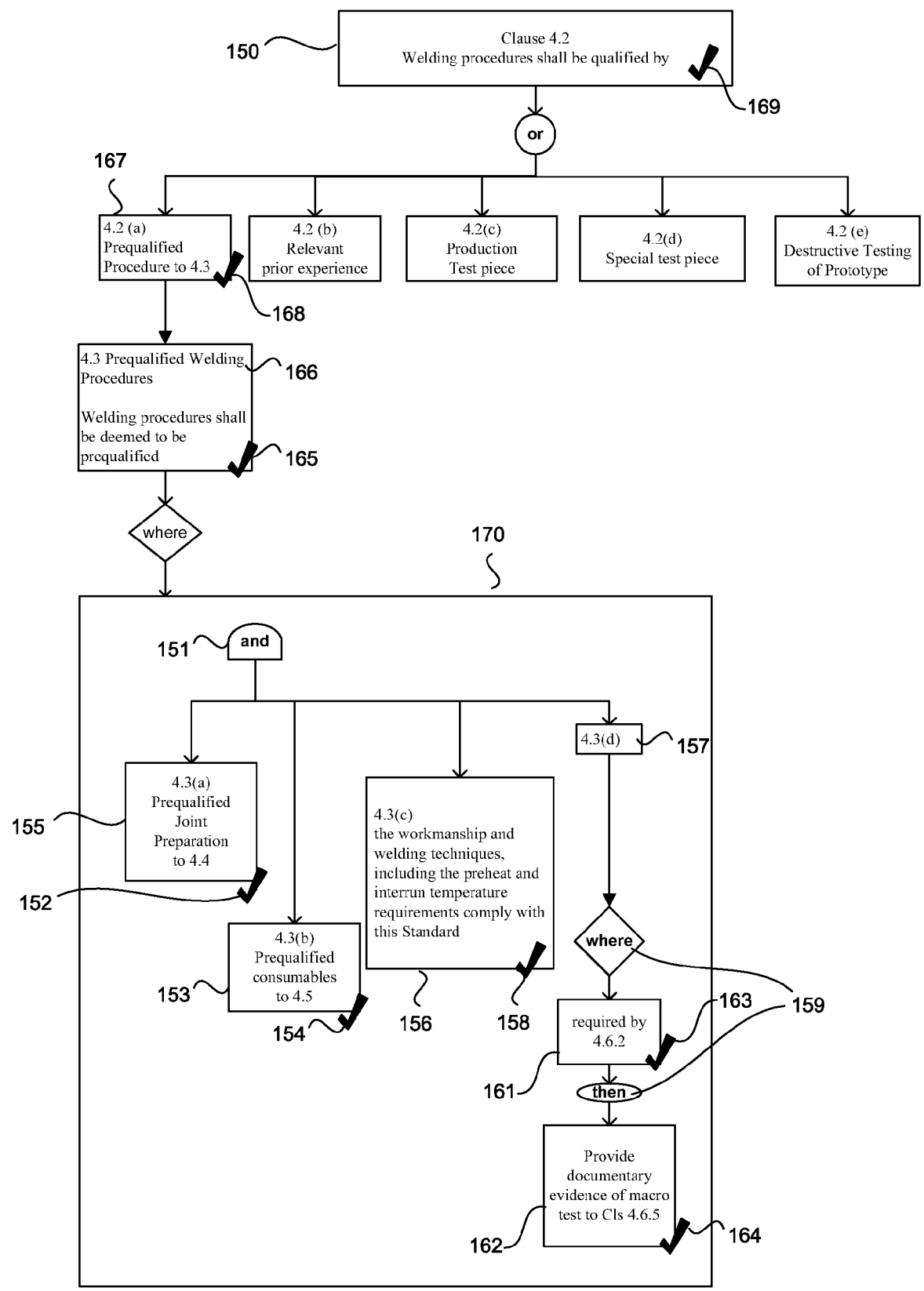
FIG. 6 shows the document map of FIG. 5 after full compliance.
Figure 22:
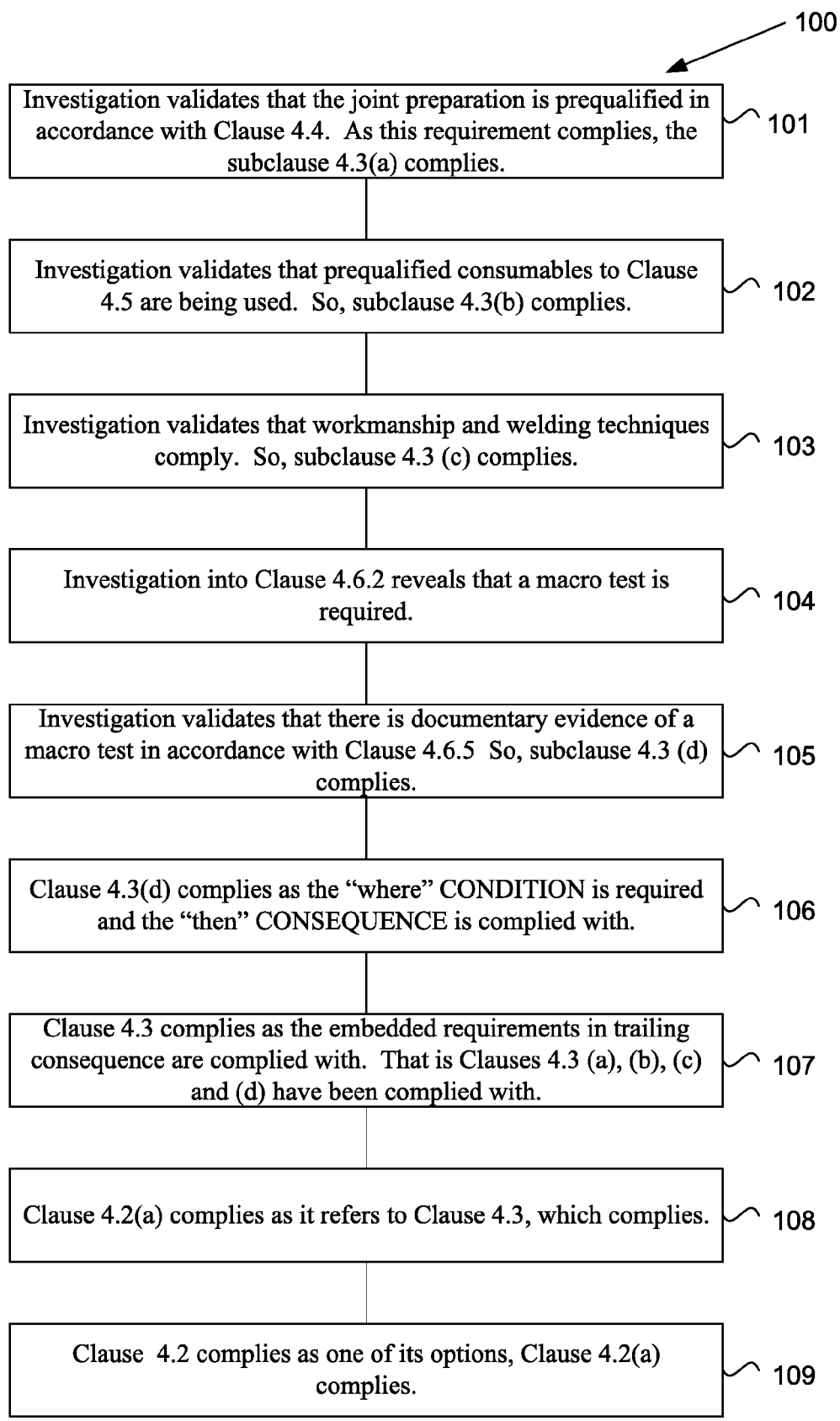
FIG. 22 shows a flowchart for validating the contract document of FIG. 21.

FIG. 21 provides an example of a document 220 which a user wishes to navigate. For the purposes of providing a realistic example, the example document is an extract from Australian Standard AS/NZS 1554.1 which is titled "Welding of structural steel". Thus the document of FIG. 21 relates to a welding procedure. However, the specific content of the document is provided only as an example of how the text portions of the document may be shifted and located into a document map and subsequently validated for compliance. The specific content of the document, i.e. aspects of the welding procedure, are not considered to form a part of the invention and many other examples of logically structured documents may be considered. FIGS. 5 and 6 show a document map for the clauses of the document 220 of FIG. 21 that is presented to the user on the system interface. The document map shows the logical structure of the document 220 with the text of the requirements, e.g. 4.2(a), 4.2(b) etc. placed in text boxes. FIG. 22 provides a flowchart 100 that illustrates the steps in navigating the document. In the present example, the user is attempting to determine whether clause 4.2 is satisfied 150. Starting at the first branch 155 of the "Multiple" or AND node 151 in FIG. 5, and as written at step 101 in FIG. 22, the user has verified that the cross referenced clause 4.4 has been complied with and thus 4.3(a) has been complied with. The user indicates compliance with the requirement by placement of a tick 152 or similar indicator in the compliance field. At step 102, the user has validated that cross referenced clause 4.5 153 has been complied with and thus the map shows that clause 4.3(b) also indicates compliance by tick 154. Continuing the validation procedure, at step 103, investigation reveals that the requirements of clause 4.3(c) 156 have been met and the user indicates this through the interface (FIG. 6) by tick 158. Clause 4.3(d) 157 contains a leading conditional requirement (WHERE/THEN) 159 cross referenced to clause 4.6.2. The user tests clause 4.6.2 (step 104) to see if the conditional requirement 161 is met. If the conditional requirement 161 is not met, then 4.3(d) will be automatically satisfied, otherwise, if the conditional requirement 161 is met, then the consequential requirement 162 will also have to be satisfied. In the present example, as indicated at step 104, investigation into Clause 4.6.2 reveals that a macro test is required, i.e. the CONDITION requirement 161 of the WHERE statement is true, which is indicated by compliance tick 163. Because the where condition 161 is true, evaluation of the THEN CONSEQUENCE requirement 162 is necessary. At step 105, the investigation validates that there is documentary evidence of a macro test in accordance with Clause 4.6.5 and so the compliance field of consequence 162 is updated with compliance tick 164. Therefore, subclause 4.3 (d) complies (step 106) and the compliance map (FIG. 6) is updated with compliance tick 164.

Because section 4.3 166 identifies a "Multiple requirement embedded in a trailing conditional requirement" element (IF [AND]) all requirements within the trailing consequence requirement 170 of section 4.3 will need to be complied with before clause 4.3 166 is complied with. Step 107 shows that Clause 4.3 complies because the embedded requirements in the trailing consequence have been complied with. That is, Clause 4.3(a) 155, Clause 4.3(b) 153, Clause 4.3(c) 156 and Clause 4.3(d) 157 have been complied with and so the complete compliance field of Clause 4.3 166 self-validates with compliance tick 165. As indicated at step 108, compliance of Clause 4.3 166 validates compliance of clause 4.2(a) 167, shown by compliance tick 168. The sections of clause 4.2 150 are linked by "Choice of" element and thus only one requirement need be validated as complied. Therefore, validation of clause 4.2(a) 167 automatically validates clause 4.2 150 (step 109) as shown by compliance tick 169.

Figure 7:
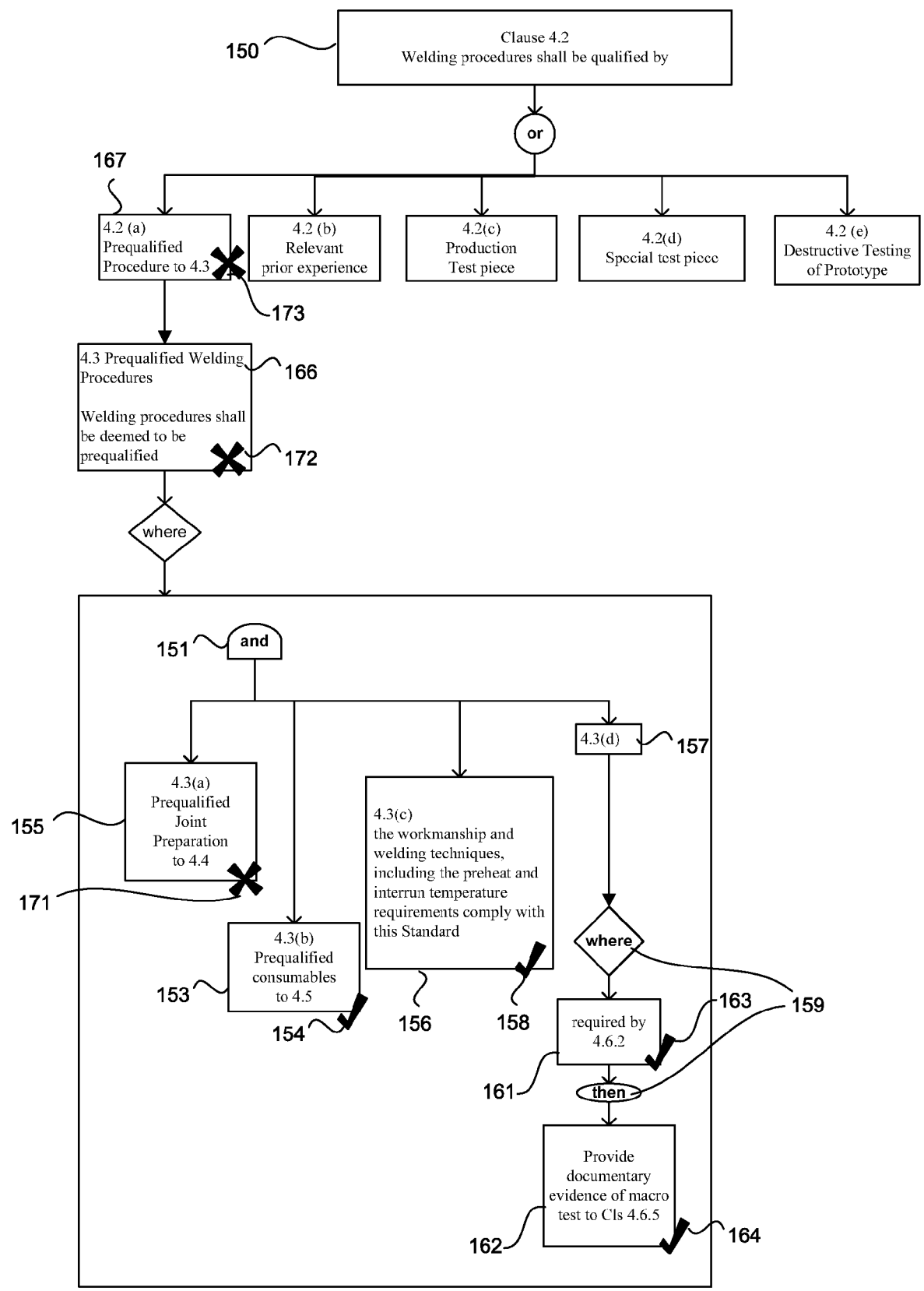
FIG. 7 shows the affect of a non-complying requirement in the document map of FIG. 5.

In FIG. 7, the effect of a non-conforming clause 4.3(a) 155, indicated by cross 171 on clause 4.2(a) is shown. Because Clause 4.3 166 has four AND requirements, non-compliance of a single clause, e.g. clause 4.3(a) 155 causes non-compliance of the entire clause 4.3, as shown by cross 172. In turn, clause 4.2(a) 167 is non-compliant, as shown by cross 173 in the compliance field of clause 4.2(a) 167. Therefore, in order for clause 4.2 to be compliant, at least one of clauses 4.2 (b), (c), (d), or (e) must be complied with.

Figure 8:
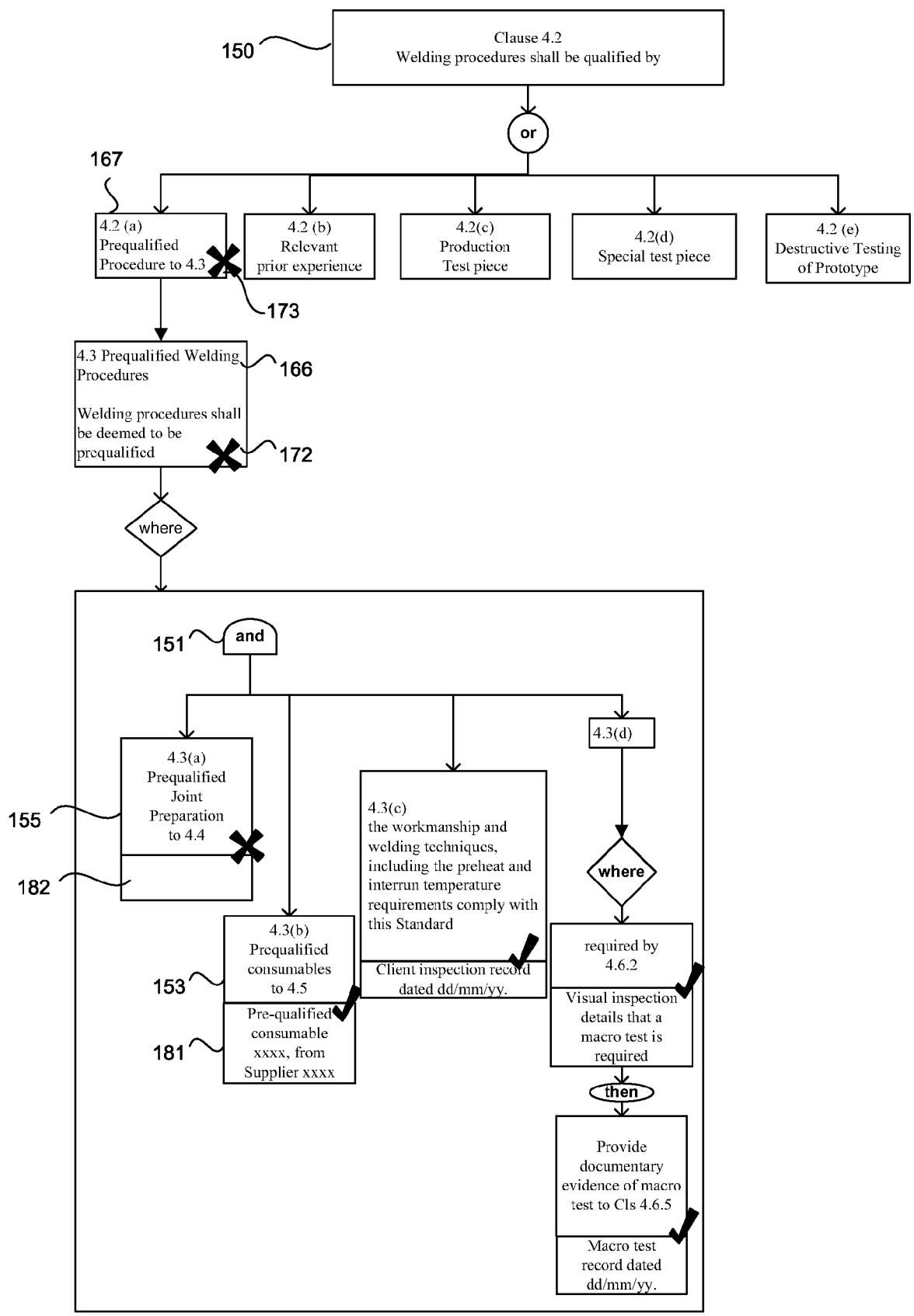
FIG. 8 shows a document map including evidence fields.

Each unique requirement box on the validation interface may be divided with one portion detailing the requirement and another portion detailing compliance evidence. FIG. 8 shows an extension of the document map of FIG. 7 in which requirement box 153 includes a portion 181 for providing compliance evidence. Compliance evidence has been provided for requirement box 153 and so remains validated. However, requirement box 155 has an empty compliance evidence 182 field and so remains unvalidated.

Figure 9:
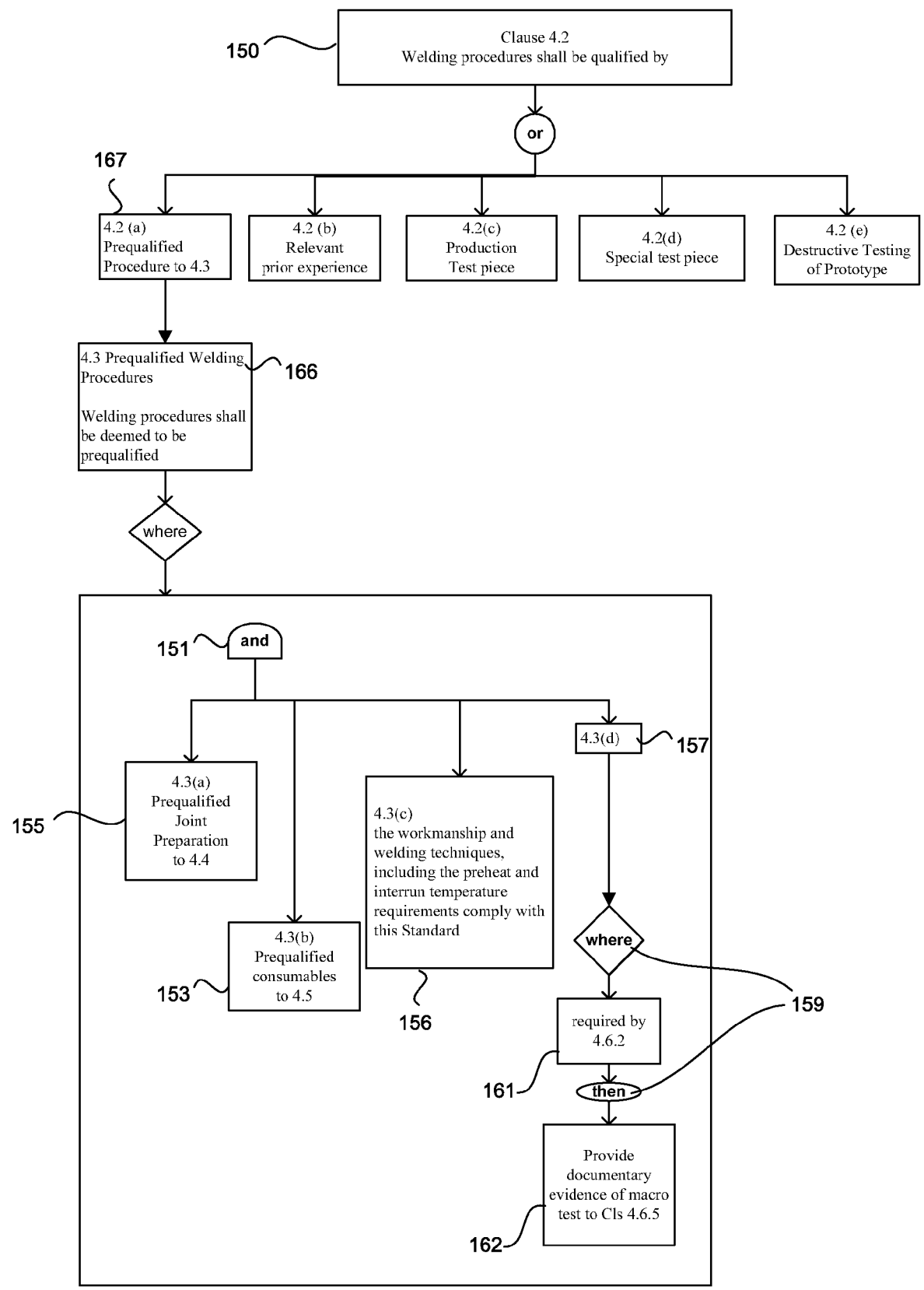
FIG. 9 shows how a document map can be used to plan compliance.
Figure 23:
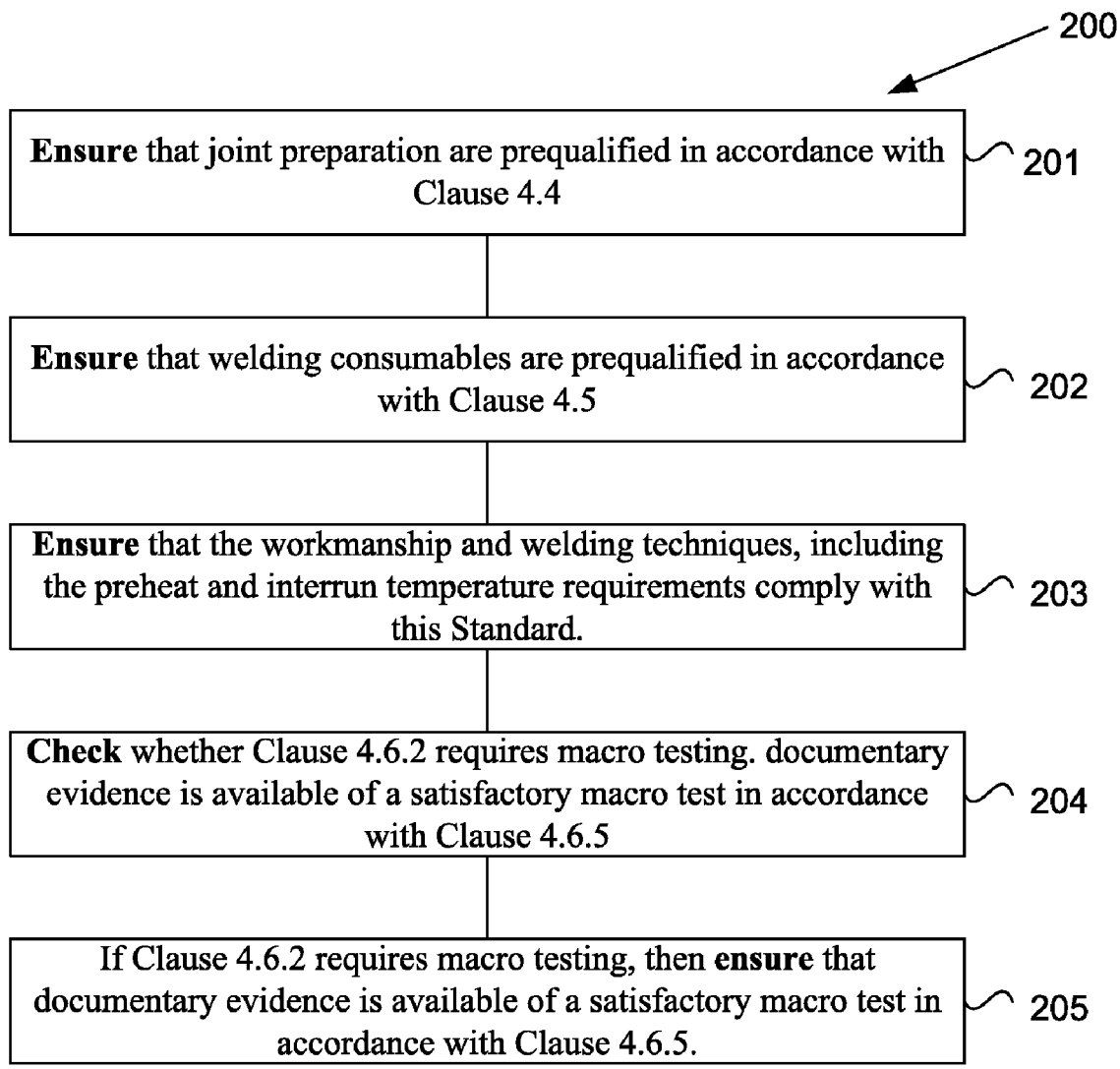
FIG. 23 shows a flowchart provided a validation action plan for the contract document of FIG. 21.

The above validation example uses past actions known to the user to determine whether a clause or indeed an entire document has been complied with. In a further embodiment, the validation application allows a user to determine an action plan for validating a clause or document. FIG. 9 shows the document map of FIG. 6 with all compliance fields cleared. Clause 4.2 150 in FIG. 9 is an "OR" clause, and thus only one requirement of Clause 4.2 needs to be validated. In the example, the user is formulating an action plan for validating the clause according to subclause 4.2(a) 167. Clause 4.2(a) 167 cross references clause 4.3 166 which contains four "Multiple" class requirements, 155, 153, 156, 157. Moving further through the document map, it can be determined that in order to validate the Multiple requirements clause, five individual requirements 155, 153, 156, 161, 162 must be validated. If those five individual requirements can be validated, the remaining requirements of clause 4.2 will be automatically validated. These five requirements can be considered the terminating requirements and can be mapped into an action plan 200 such as shown in FIG. 23. At step 201, the action plan 200 details the text of the requirement 155. At step 202, the action plan 200 details the text of the requirement 153. At step 203, the action plan 200 details the text of the requirement 156. At step 204, the action plan 200 specifies to check whether the text of the condition requirement 161 is met and, if so, specifies the text of the consequence requirement 162 for step 205.

The action plan concisely identifies the steps a user must undertake in order to prove a clause has been validated. The action plan may further be exported to any known project management software application, for example Project Manager™ produced by Microsoft Corporation.

A further use of the mapping system is in comparing validation options. Action plans for each option available to validate a clause can be determined. For example, clause 4.2 of the document map of FIG. 9 may be validated by validating any of sub-clauses 4.2 (a)-(e). The action plans for validating each of clause 4.2(a)-(e) can be generated and compared to determine the most suitable manner for complying with a clause, e.g. the most cost effective, the least resource or manpower intensive, etc.

Validation of a requirement may occur from the bottom up as described above, from top down or in any other suitable manner as appropriate.

The above described embodiments of FIGS. 5 to 7 include examples of cross referencing. Cross referencing may be indicated explicitly on the map as illustrated for example by the link between clause 4.2(a) and the AND node of clause 4.3, or in an alternative embodiment by hyperlinking. Alternatively, cross referencing may be implicit in that it may not be displayed on the document map other than through text. However, validation of an implicit link may still cause the automatic validation of a dependent requirement.

The system of the invention can not only be used in navigating existing documents but can be linked with a newly created document to create a map as a document is drafted. Text sections can be accessed individually and amended with the effects of changes to an existing section or the creation of a new section being readily apparent from the document map.

In a further embodiment, the system database stores construction rules for constructing a document from a document map. An exemplary rule for the Multiple Requirements class would be that the text of each requirement is separated by a comma with the final two requirements being separated by an "and". A rule for the Conditional Requirement class would be that an "if" element is placed before the text of the conditional requirement, followed by a "then" element, in turn followed by the consequential requirement. Thus a user may draft a document by first creating a document map and writing the text of the requirements into the requirement boxes. The construction rules then map from the mapping interface into a document interface e.g. Microsoft Word™ in accordance with the mapping rules. Because the mapping is conducted as the initial step, the user can be sure that the grammatical construction of the document is correct.

For maximum flexibility, a system user may amend the element class lists to add or delete document elements as required. The user may also amend the format and mapping rules including the way in which links between elements on this map are depicted, the colour, font etc of elements and the symbols used.

Figure 11:
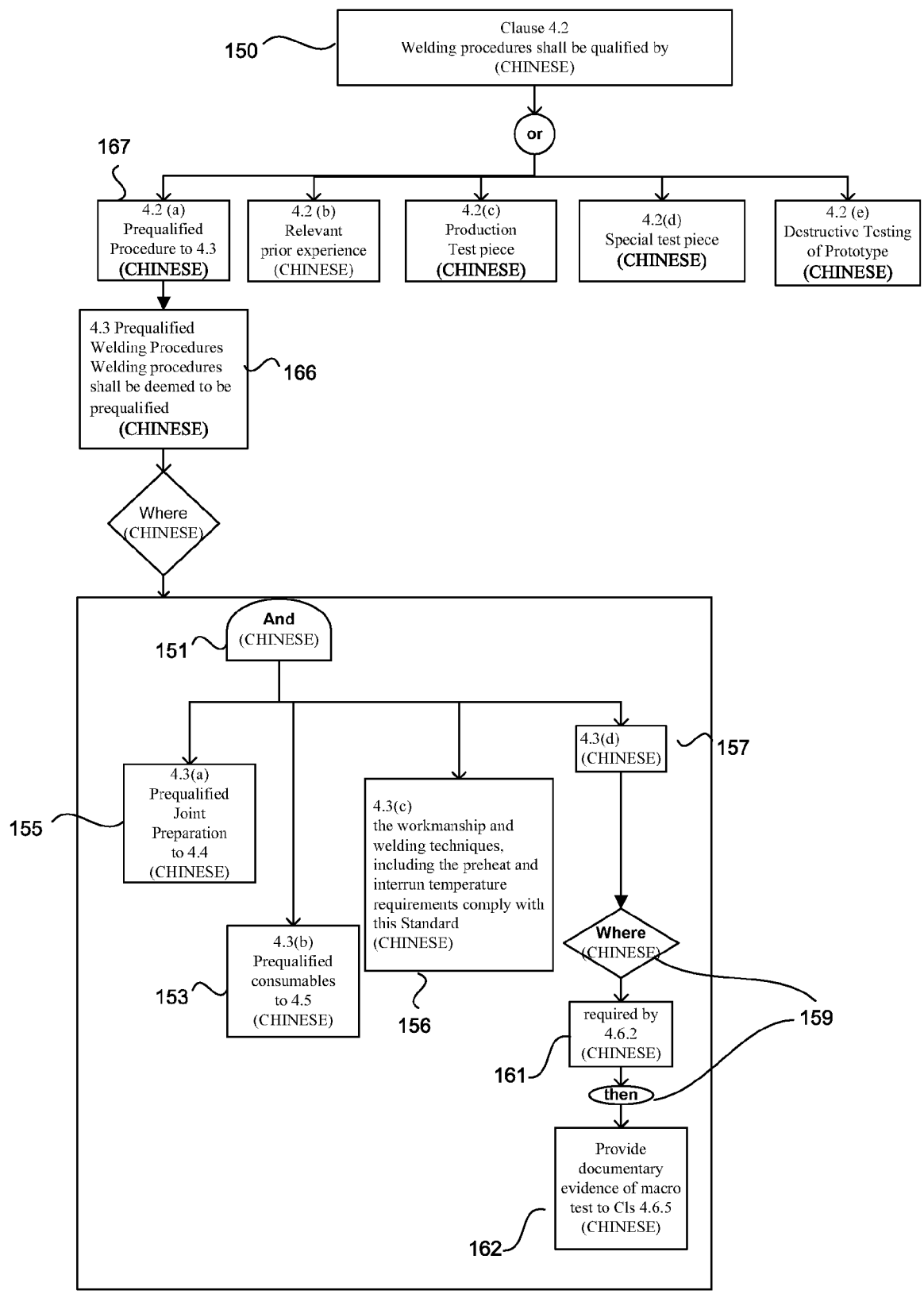
FIG. 11 shows the document map of FIG. 5 that has been translated into Chinese, as one example of a translation procedure that maintains the logical structure of the document map.

The database may store document elements for a plurality of languages in order that the system can be applied to a wider range of documents. For example, FIG. 11 shows the document map of FIG. 5 produced from the document 220 of FIG. 21. However, the clauses, requirements and element class headings have been translated into Chinese. For example, Clause 4.3(a) 155 shown in FIG. 11 corresponds to Clause 4.3(a) 155 of FIG. 5 but with the text of the text box 155 displaying the Chinese translation of the text of Clause 4.3(a). The system may store classification and format rules for each language to account for different grammatical structures between languages. Furthermore, the system of the invention can be used to verify the translation of a formatted document from one language to another because the structure of the document map for a document should be the same irrespective of the language in which is written. By comparing maps for a document before and after translation, any significant translation errors that cause a change in the document structure can be readily identified. While an example of a Chinese translation has been provided, it will be apparent to a person skilled in the art that translations may be made into any language since the rules of logic that may be applied to structured documents are universal.

The system of the invention can be used in drafting and analyzing many formatted documents including but not limited to contracts, purchase orders, instructions, standards, specifications, tenders, bids, leases, finance loans, investments, deeds, conveyances, agreements, rules, codes, insurance and other policies, government legislation and statutory regulations. In particular the system of the invention allows a user to readily identify the extent of options within a document and the effect of any changes to the document.

It will be appreciated by the skilled person to which the specification is addressed that numerous modifications and/or variations can be made to the above described embodiments without departing from the spirit or scope of the invention and that all such modifications and/or variations are intended to be embraced herein.

The invention claimed is:

1. A computer implemented method of formatting a document comprising:
   a) providing a database comprising:
      (i) a plurality of document element classes;
      (ii) a set of document section formatting rules for each document element class; and
      (iii) a set of document elements for each document element class; and
   in a computer system comprising at least one processor operatively associated with the database:
   b) obtaining an electronic document;
   c) identifying at least one of the document elements within the electronic document;
   d) for one or more of the document elements identified within the electronic document:
      (i) identifying a document section within the electronic document that is associated with the respective identified document element;
      (ii) classifying the respective identified document element into one of the document element classes;
      (iii) determining the document section formatting rules associated with the classified document element class;
      (iv) determining whether said document section is formatted in accordance with the document section formatting rules of the classified document element class; and
      (v) where the document section is not formatted in accordance with the document section formatting rules of the classified document element class, selecting one or more of the document section formatting rules of the classified document element class and applying the selected one or more document section formatting rules to the document section to re-format the document section to a re-formatted document section that accords with the selected one or more document section formatting rules; and
   e) displaying a re-formatted version of the electronic document including one or more of the re-formatted document sections.

2. A computer implemented method according to claim 1 wherein said document element classes comprise logical element classes, each logical element class representing a logical operator, wherein the document elements of a logical element class comprise one or more text strings used to express the respective logical operator.

3. A computer implemented method according to claim 2 wherein said plurality of document element classes includes one or more of a multiple requirement class, a choice of requirement class and a conditional requirement class.

4. A computer implemented method according to claim 3 wherein each document element in said multiple requirement class is a word or phrase indicative of the logical operator "and"; wherein each document element in said choice of requirement class is a word or phrase indicative of the logical operator "or"; and wherein each document element in said conditional requirement class is a word or phrase indicative of the logical operator "if".

5. A computer implemented method according to claim 2 wherein said plurality of document element classes includes one or more of a mandatory requirement class and an optional requirement class.

6. A computer implemented method according to claim 5 wherein each document element in said mandatory requirement class is a word or phrase indicative of the logical operator "shall" and wherein each document element in said optional requirement class is a word or phrase indicative of the logical operator "should".

7. A computer implemented method according to claim 2 wherein said plurality of document element classes includes one or more of at least one preferential requirement class, at least one exception requirement class, or a sequential requirement class.

8. A computer implemented method according to claim 7 wherein said at least one exception requirement class includes a trailing exception requirement class and leading exception requirement class, wherein each document element in said trailing exception requirement class and said leading exception requirement class is a word or phrase indicative of the word "except".

9. A computer implemented method according to claim 7 wherein each document element within said at least one sequential requirement class includes a word or phrase indicative of the word "then".

10. A computer implemented method according to claim 7 wherein said at least one preferential requirement class includes a leading preferential requirement class and a trailing preferential requirement class, wherein each document element within said leading preferential requirement class and said trailing preferential requirement class is a word or phrase indicative of the word "prefer".

11. A computer implemented method according to claim 1 wherein steps (d)(i) to (d)(v) are repeated for each document element identified within the electronic document.

12. A computer implemented method according to claim 1 wherein at least one of said plurality of document element classes includes a plurality of document elements, wherein the document section formatting rules comprise that one of said plurality of document elements within a document element class is a preferred document element and the remainder of said plurality of document elements within that document element class are non-preferred document elements, and wherein re-formatting of a document section comprises substituting a non-preferred document element within the document section for a preferred document element.

13. A computer implemented method of formatting a document comprising:
   a) providing a database comprising:
      (i) a plurality of document element classes;
      (ii) a set of clause formatting rules for each document element class; and
      (iii) a set of document elements for each document element class; and
   in a computer system comprising at least one processor operatively associated with the database:
   b) obtaining an electronic document;
   c) identifying a clause within the electronic document;
   d) identifying one or more of said document elements within said clause;
   e) for one or more of the document elements identified within the clause:
      (i) classifying the respective identified document element into one of the document element classes;
      (ii) determining the clause formatting rules associated with the classified document element class;
      (iii) determining whether said clause is formatted in accordance with the clause formatting rules of the classified document element class; and
      (iv) where the said clause is not formatted in accordance with the clause formatting rules of the classified document element class, selecting one or more of the clause formatting rules of the classified document element class and applying the selected one or more clause formatting rules to said clause to re-format said clause to a re-formatted clause that accords with the selected one or more clause formatting rules; and
   f) displaying a re-formatted version of the electronic document including one or more of the re-formatted clauses.

14. A computer implemented method according to claim 13 wherein said document element classes comprise logical element classes, each logical element class representing a logical operator, wherein the document elements of a logical element class comprise one or more text strings used to express the respective logical operator.

15. A computer implemented method according to claim 14 wherein said plurality of document element classes includes one or more of a multiple requirement class, a choice of requirement class and a conditional requirement class; wherein each document element in said multiple requirement class is a word or phrase indicative of the logical operator "and"; wherein each document element in said choice of requirement class is a word or phrase indicative of the logical operator "or"; and wherein each document element in said conditional requirement class is a word or phrase indicative of the logical operator "if".

16. A computer implemented method according to claim 14 wherein said plurality of document element classes includes one or more of a mandatory requirement class and an optional requirement class; wherein each document element in said mandatory requirement class is a word or phrase indicative of the logical operator "shall" and wherein each document element in said optional requirement class is a word or phrase indicative of the logical operator "should".

17. A computer implemented method according to claim 13 wherein steps (d) and (e)(i) to (e)(iv) are repeated for each clause identified within said electronic document.

18. A computer implemented method according to claim 13 wherein at least one of said plurality of document element classes includes a plurality of document elements, wherein the clause formatting rules comprise that one of said plurality of document elements within a document element class is a preferred document element and the remainder of said plurality of document elements within that document element class are non-preferred document elements, and wherein re-formatting of a clause comprises substituting a non-preferred document element within the clause for a preferred document element.

19. A system for formatting a document comprising:
   a database that stores:
      a plurality of document element classes;
      a set of document section formatting rules for each document element class; and
      a set of document elements for each document element class;
   a processor configured to provide an interface on a display, the interface providing:
      a display of an electronic document;
      means for identifying at least one of the document elements within the electronic document;
      means for identifying a document section within the electronic document that is associated with said at least one identified document element;
      means for classifying the identified document element into one of the document element classes;
      means for determining the document section formatting rules associated with the classified document element class;
      means for determining whether said document section is formatted in accordance with the document section formatting rules of the classified document element class;
      means for re-formatting the document section in accordance with the document section formatting rules of the classified document element class; and
      a display of a re-formatted version of the electronic document on the display including one or more of the re-formatted document sections.

* * * * *